United States Patent
Pacary et al.

(10) Patent No.: US 8,696,911 B2
(45) Date of Patent: Apr. 15, 2014

(54) DECONTAMINATION OF RADIOACTIVE LIQUID EFFLUENT BY SOLID-LIQUID EXTRACTION USING A RECYCLE LOOP

(75) Inventors: Vincent Pacary, Bagnols sur Ceze (FR); Yves Barre, Uchaux (FR); Edouard Plasari, Nancy (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 676 days.

(21) Appl. No.: 12/918,032

(22) PCT Filed: Feb. 17, 2009

(86) PCT No.: PCT/EP2009/051862
§ 371 (c)(1),
(2), (4) Date: Oct. 13, 2010

(87) PCT Pub. No.: WO2009/103703
PCT Pub. Date: Aug. 27, 2009

(65) Prior Publication Data
US 2011/0036777 A1    Feb. 17, 2011

(30) Foreign Application Priority Data
Feb. 18, 2008    (FR) ..................... 08 51023

(51) Int. Cl.
*B01D 15/00*    (2006.01)
(52) U.S. Cl.
USPC ............ 210/667; 210/672; 210/682; 210/194
(58) Field of Classification Search
USPC .................. 210/667, 672, 682, 194
See application file for complete search history.

(56) References Cited

U.S. PATENT DOCUMENTS 3,649,147 A * 3/1972 Fritsch .......................... 425/170

FOREIGN PATENT DOCUMENTS

| BE | 535 584 A | 2/1955 |
| DE | 37 44 699 A1 | 12/1988 |
| EP | 0 180 308 A | 5/1986 |
| FR | 1 399 711 A | 5/1965 |
| FR | 2 478 364 A | 9/1981 |

* cited by examiner

*Primary Examiner* — Chester Barry
(74) *Attorney, Agent, or Firm* — Miles & Stockbridge P.C.

(57) ABSTRACT

The invention relates to a continuous process for decontaminating a radioactive liquid effluent comprising one or more radioactive chemical elements to be removed that comprises the following steps:
  a step of bringing said radioactive liquid effluent into contact, in a first reactor, with solid particles capable of capturing and retaining said radioactive chemical element(s) to be removed, by means of which a suspension of solid particles containing said radioactive chemical element(s) to be removed is obtained;
  a step of settling said suspension, in a second reactor, by means of which a solid phase is obtained that comprises the solid particles containing said radioactive chemical element(s) to be removed and a liquid phase depleted or devoid of said radioactive chemical element(s) to be removed;
  a step of separating said solid phase and said liquid phase;
  characterized in that a portion of said solid phase obtained at the end of the settling step is reinjected into the first reactor for the implementation of a contacting step as defined above.
Application to the treatment of radioactive liquid effluents originating from nuclear installations.

7 Claims, 1 Drawing Sheet

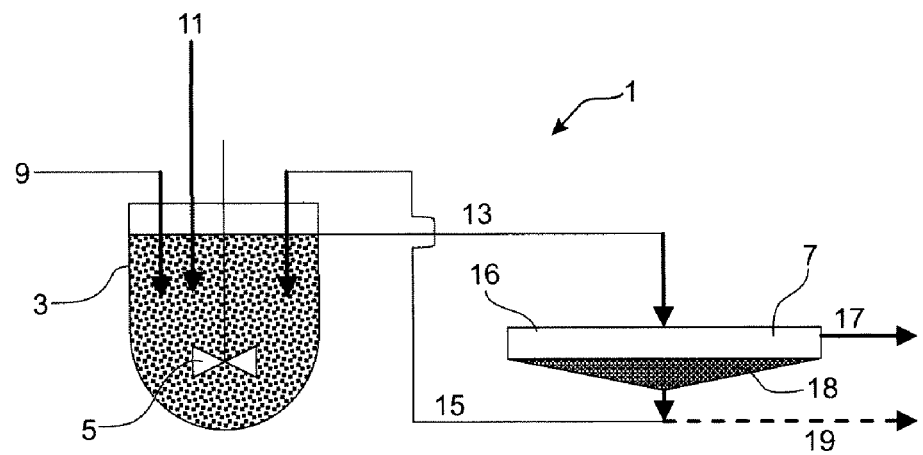

DECONTAMINATION OF RADIOACTIVE LIQUID EFFLUENT BY SOLID-LIQUID EXTRACTION USING A RECYCLE LOOP

TECHNICAL FIELD

The present invention relates to a process for decontaminating a radioactive liquid effluent comprising one or more chemical elements to be removed, said elements being radionuclides, said process involving a step of solid-liquid extraction (or step known as a coprecipitation step).

Such a process finds, in particular, its application in the reprocessing of radioactive liquid effluents, loaded in particular with strontium, ruthenium, americium, plutonium, uranium or else caesium.

PRIOR ART

The treatment for decontaminating liquid effluents, especially radioactive liquid effluents, by coprecipitation was developed in the 1960s. This consists in introducing, into the liquid effluent to be decontaminated, preformed solid particles and/or reactants that are precursors of said particles, said reactants reacting in situ in the liquid effluent to be decontaminated in order to form said particles. These particles are chosen for their ability to selectively capture and retain said element(s) to be removed. Among the solid particles capable of capturing and retaining metallic elements, mention may be made of:
- the particles of barium sulphate capable of capturing and retaining strontium;
- the particles of iron and copper hydroxides capable of capturing and retaining ruthenium and $\alpha$ emitters, such as americium, plutonium and uranium; and
- the particles of nickel and cobalt ferrocyanides capable of selectively capturing and retaining caesium.

The decontamination treatment may be carried out according to two modes:
- a batch mode, in which only a predetermined volume of liquid effluent to be decontaminated, introduced into a reactor, is treated, introduced into which reactor are the solid particles capable of capturing and retaining said chemical element(s) to be removed and/or the reactants that are precursors of said particles;
- a continuous mode, in which the effluent to be decontaminated, the solid particles capable of capturing and retaining said chemical element(s) to be removed and/or the reactants that are precursors of said particles are introduced into a reactor continuously, with a constant or variable flow rate, the addition of the particles and/or reactants possibly being carried out in a cascade of reactors.

Whether for the batch or continuous mode, obtained, at the end of the treatment in the reactor, is a suspension of solid particles that have captured the elements to be removed that were initially present in the liquid effluent. The final part of the treatment then consists in carrying out a liquid/solid separation step generally in a settling tank. This step may be facilitated by adding a coagulating agent and/or a flocculating agent to the suspension. The solid phase recovered at the end of this separation step (referred to at this stage as "sludge") is then considered to be final waste and is packaged, generally in bitumen or in a cement matrix, before being stored. The decontaminated liquid is, itself, discharged into the environment, if its radiological and chemical composition permits it. Failing that, the liquid can be made to undergo, again, a subsequent decontamination treatment.

For liquid effluents that have a high activity or that have undergone only a partial decontamination at the end of a previous treatment, it may be useful to subject these effluents to a further contacting with solid particles that complex chemical elements, which results, at the end of the treatment operation, in an amount of sludge generated that is increased by the number of treatments necessary and therefore, in the end, in a large storage volume.

Therefore, there is a real need for a continuous process for decontaminating radioactive liquid effluents that makes it possible to limit the amount of solid particles to be used for decontaminating a given volume of liquid effluent, in order to limit the volume of decontamination sludge obtained at the end of the decontamination process, and thus, the containment volume of the sludges obtained while preserving or even improving the decontamination efficiency.

SUMMARY OF THE INVENTION

Thus, the invention relates to a continuous process for decontaminating a radioactive liquid effluent comprising one or more radioactive chemical elements to be removed that comprises the following steps:
- a step of bringing said liquid effluent into contact, in a first reactor, with solid particles capable of capturing and retaining said radioactive chemical element(s) to be removed, by means of which a suspension of solid particles containing said radioactive chemical element(s) to be removed is obtained;
- a step of settling said suspension, in a second reactor, by means of which a solid phase is obtained that comprises the solid particles containing said radioactive chemical element(s) to be removed and a liquid phase depleted or devoid of said radioactive chemical element(s) to be removed;
- a step of separating said solid phase and said liquid phase; characterized in that a portion of said solid phase obtained at the end of the settling step is reinjected into the first reactor for the implementation of a contacting step as defined above.

The following advantages result from this recently implemented process:
- for a given quantity of radioactive chemical elements to be removed, an improvement of the decontamination efficiency without an increase in the amount of solid phase generated, due to the reuse of a portion of the solid phase for decontaminating the liquid effluent;
- in the end, a reduction of the solid waste, due to the reuse of a portion of the solid phase for removing the required radioactive chemical elements;
- consequently, an improvement in the decontamination efficiency and/or a concentration of the radioactive chemical elements to be removed in a smaller volume of solid waste.

It is specified that the expression "continuous process" is understood conventionally to mean a process in which the steps are carried out without interruption, namely that, at time t, a volume of liquid effluent undergoes the contacting step whilst another volume undergoes the settling and separation step.

In accordance with the invention, the process comprises a step of bringing said liquid effluent into contact, in a first reactor, with solid particles capable of capturing and retaining said radioactive chemical element(s) to be removed, by means of which a suspension of solid particles containing said radioactive chemical element(s) to be removed is obtained.

The solid particles capable of capturing and retaining said element(s) from the contacting step are, conventionally, in accordance with the process of the invention, of two types:
- one portion originates from a continuous flow into the first reactor of unused particles (namely that have not yet undergone a contacting step with the liquid effluent) and/or of reactants capable of generating, by chemical reaction, said particles; and
- the other portion results from the aforementioned reinjection step.

Due to the fact that the decontamination process is a continuous process, the first reactor is, conventionally, fed throughout the course of the process, by a flow of liquid effluent to be decontaminated and by a flow of particles and/or reactants as mentioned above, a portion of the flow of particles originating from the reinjection step.

The first reactor may comprise, advantageously, a stirring device that makes it possible to ensure the mixing of the incoming flows and the homogenization of the contents of the reactor. In this scenario, the assembly constituted by the liquid effluent and the particles forms a suspension, without there being sedimentation of the solid particles in the first reactor.

Due to the fact that the incoming flows are continuous, overfilling may occur, in which case the process could comprise, concomitantly with the contacting step, a step of discharging the overfill, for example via an overflow.

The solid particles capable of capturing and retaining the radioactive chemical element(s) to be extracted from the liquid effluent will be chosen so as to capture and retain the radioactive chemical element(s) in question. The radioactive chemical elements may be chosen from strontium, ruthenium, caesium, $\alpha$ emitters, such as americium, plutonium and uranium, and mixtures thereof. The decontamination process of the invention may be a process for decontaminating radioactive liquid effluents originating, for example, from nuclear installations.

By way of example, when the chemical element is strontium, the solid particles may be particles of barium sulphate, of barium carbonate, of calcium carbonate, of iron hydroxide, of calcium phosphate, of iron phosphate, of manganese dioxide, of titanium dioxide and preferably of barium sulphate.

When the chemical element is ruthenium or an $\alpha$ emitter, such as americium, plutonium and uranium, the solid particles may be particles of iron hydroxide and copper hydroxide.

When the chemical element is caesium, the solid particles may be particles of nickel and cobalt ferrocyanides, of tetraphenylborate and/or more generally particles having a zeolite structure. Preferably, the solid particles capable of capturing and retaining caesium are particles of nickel and cobalt ferrocyanides.

Once the contacting step has been carried out, the process of the invention comprises a settling step, this settling step conventionally consisting in leaving the suspension obtained during the preceding step at rest in a reactor of the settling tank type so as to obtain sedimentation of the particles that have captured and retained the chemical element(s) to be removed. Thus, obtained at the end of this step are a phase comprising said particles in the lower portion of the settling tank and a supernatant liquid phase depleted or even devoid of said radioactive chemical element(s) to be removed and consequently depleted or devoid of said solid particle(s).

The settling step, due to the fact that it does not involve a membrane, has the advantage of not causing radioactive contamination of a membrane and thus the problems that follow on from such a decontamination. Indeed, the use of a membrane, especially of an organic membrane such as is conventionally used in the field of solid-liquid separation, would generate problems in the transport and packaging of such contaminated membranes, especially due to a potential release of hydrogen linked to the radiolysis of these membranes by the radioactive elements trapped in them.

From a practical point of view, the second reactor of the settling tank type is fed by an outlet flow from the first reactor, this outlet flow comprising said suspension. The settling may be facilitated by a step of adding a coagulant and/or a flocculant to the second reactor.

Due to the fact that the process of the invention is a continuous process, the amount of upper liquid phase and of lower solid phase would be caused to increase, if no discharge arrangement was provided.

Thus, the process of the invention comprises a step of separating said solid phase and said liquid phase, the supernatant liquid phase being conventionally discharged via an overflow, whilst the solid phase is conventionally discharged by drawing off, generally in a batch manner, a portion of this solid phase being reinjected into the first reactor in order to participate again in the contacting step with another volume of liquid effluent to be decontaminated. The recovered liquid phase which is depleted or even devoid of radioactive chemical elements which are retained by the phase enriched with solid particles may either be released into the environment, if the radiological examination allows it, or subjected to other treatments, where necessary.

As mentioned previously, a portion of the solid phase obtained after settling is reinjected into the first reactor, generally in the form of a flow conveying the solid phase from the second reactor to the first reactor (this flow possibly being described as a "recycle loop").

The operation of this loop has the effect of bringing the solid phase back into contact with the liquid effluent loaded with chemical element(s) to be removed. The solid phase is still capable of fixing a certain amount of these chemical elements, which thus has the consequence of increasing the chemical activity of these particles.

Thus, due to the continuous nature of the process of the invention, the amount of particles leaving the first reactor and conveyed to the second reactor results from two contributions:
- on the one hand, that linked to the injection of the preformed particles and to the chemical reactions induced by the contacting of the reactants, where appropriate;
- and on the other hand, that provided by the recycle loop.

It is understood that the amount of radioactive chemical elements retained in the solid phase increases with the amount of solid particles in the first reactor. In so far as the step of reinjecting solid particles makes it possible to increase the concentration of solid particles in the reactor, the process of the invention thus makes it possible to carry out a more thorough decontamination of the effluents to be treated.

Moreover, by virtue of the reinjection step, it is also possible to reduce the total amount of reactants and/or of solid particles to be introduced during the treatment. Despite the introduction of fewer reactants and/or solid particles into the first reactor, the decontamination efficiency may be retained or even improved by adjusting the flow rate for the reintroduction of particles from the second reactor to the first reactor.

The decrease in the particles and/or reactants introduced into the first reactor results in a reduction of the total volume of solid waste. Since the efficiency is retained or even improved, the extraction activity is increased.

Prior to carrying out the aforementioned steps (contacting, settling and separation steps), the process of the invention may advantageously comprise a step of filling the first reactor with a predetermined volume of liquid effluent to be treated and with a predetermined amount of solid particles capable of capturing and retaining said radioactive chemical element(s) to be removed and/or reactants as defined previously and, advantageously, a step of filling the second reactor with a suspension comprising solid particles capable of capturing and retaining said radioactive chemical element(s) to be removed, so that, during the first startup of the contacting step, the reinjection step can take place starting from said suspension.

Once the process is under way, the solid phase that is subsequent reinjected will be constituted of solid particles that have already undergone the contacting step.

Other features and advantages of the invention will appear more clearly on reading the following example given by way of illustration and non-limiting, with reference to the appended single FIGURE.

BRIEF DESCRIPTION OF THE DRAWINGS

The single FIGURE represents, in the form of a schematic diagram, an example of an installation intended to allow the implementation of the process of the invention.

DETAILED DESCRIPTION OF PARTICULAR EMBODIMENTS

Example

This example illustrates the implementation of the process of the invention for decontaminating a liquid effluent containing strontium.

For the description of this example, reference is made to the single FIGURE which represents, in the form of a schematic diagram, an example of an installation 1 designed for the implementation of the process of the invention within the context of an industrial process for decontaminating an aqueous effluent, for example resulting from the reprocessing of a spent nuclear fuel, comprising strontium.

The installation 1 respectively comprises:
- a first reactor 3 intended to receive the aqueous effluent to be decontaminated and the solid particles (or the reactants capable of reacting in order to form the appropriate particles) capable of capturing and retaining the strontium contained in the liquid effluent, this first reactor being in the form of a glass reactor having a working volume of 2.5 liters; the first reactor 3 being equipped with a stirring device 5 and metal baffles and an overflow (not represented, intended to discharge the overfill where appropriate);
- a second reactor 7 performing the role of a settling tank intended to receive the suspension formed in the first reactor, this suspension comprising the solid particles that have complexed the strontium, the second reactor being a reactor of cylindro-conical type having a working volume of 13 liters, the suspension being fed at its centre;
- a first line 9 connected to the first reactor 3 which feeds the latter with aqueous effluent comprising the strontium element to be removed, the conveyance being facilitated via a peristaltic pump (not shown);
- a second line 11 connected to the first reactor 3 which feeds the latter with reactants capable of reacting in order to form solid particles capable of capturing and retaining the strontium and/or with solid particles that are already formed (these particles being, in this case here, solid particles of barium sulphate), the conveyance being facilitated via a peristaltic pump (not shown);
- a third line 13 which connects the first reactor 3 to the second reactor 7 and which conveys, in the form of an overflow flow, the suspension comprising the solid particles that have captured and retained the strontium from the first reactor to the second reactor;
- a fourth line 15 which connects the second reactor 7 to the first reactor 3 and which conveys a portion of the solid phase settled out in the second reactor to the first reactor (also known as a recycle loop);
- a fifth line 17 which enables the decontaminated liquid phase 16 to be drawn off; and
- a sixth line 19 which makes it possible to draw off the solid phase 18 that has not been sent back to the first reactor.

The treatment efficiency is evaluated by a parameter: the decontamination factor denoted by DF. In the context of the decontamination of strontium, the DF corresponds to the ratio of the strontium concentration in the inlet flow (flow passing through the first line 9) to the same concentration in the flow exiting the first reactor (flow passing through the third line 13). The DF may also be defined as the ratio of the strontium concentration in the inlet flow (flow passing through the first line 9) to this same concentration in the flow exiting the second reactor (flow exiting through the line 17).

In the device presented above, the effluent introduced into the reactor 3 through the line 9 is composed of 0.5 mol/L of sodium nitrate, 0.1 mol/L of sodium sulphate and $1.14 \times 10^{-4}$ mol/L of strontium nitrate. The element to be removed is strontium. The flow rate of effluent in the line 9 is adjusted to 14 L/h. The reactant introduced through the line 11 is a 0.29 mol/L solution of barium nitrate and the flow rate in the line 11 is 1 L/h.

The sulphate ions introduced via the line 9 will react with the barium ions introduced via the line 11 in order to form solid particles of barium sulphate which will capture and retain the strontium.

If the recycle loop is not activated (zero flow rate in the line 15), after 40 minutes of operation, the DF measured at the outlet of the reactor 3 through the line 13 is equal to 60±5 and the DF measured at the outlet of the reactor 7 through the line 17 is equal to 100±10.

If now the flow rate of suspension in the line 15 is around 1200 g/h, the DF in the liquid phase in the line 13 is increased by a factor of around 8, i.e. around 500±150. The DF in the liquid phase of the line 17 is itself around 500±50.

The improvement in the decontamination is linked to the existence of the recycle loop and, from a chemical point of view, inter alia, to the reduction of the rate of crystalline growth of $BaSO_4$ resulting from the existence of this loop, the reduction in the rate being linked to an amount and a surface area of $BaSO_4$ crystals which are greater than those that exist in the case where there is no recycle loop. It has been observed that the reduction in the rate of crystalline growth of $BaSO_4$ promotes strontium decontamination.

Example 2

In this example, a device identical to that from example 1 is used.

The effluent introduced into the reactor 3 via the line 9 is composed of 0.5 mol/L of sodium nitrate, 0.1 mol/L of sodium sulphate and $1.14 \times 10^{-4}$ mol/L of strontium nitrate. The element to be removed is strontium. The flow rate of effluent in the line 9 is adjusted to 14 L/h. The reactant introduced via the line 11 is a 0.29 mol/L solution of barium nitrate and the flow rate in the line 11 is 0.5 L/h, i.e. divided by 2 relative to example 1. This has the result that the rate of production of barium sulphate in the reactor 3 is divided by 2. The result of this is that the hourly production of sludge is divided by 2.

If the recycle loop is not activated (zero flow rate in the line 15), the DF measured at the outlet of the reactor 3 through the line 13 is equal to 20±3 and the DF measured at the outlet of the reactor 7 through the line 17 is equal to 30±3.

If now the flow rate of suspension in the line 15 is around 3600 g/h, the DF in the liquid phase in the line 13 is increased by a factor 5, i.e. around 100±10. The DF in the liquid phase of the line 17 is itself around 150±10. It is recalled that, in order to obtain the same efficiency without using the recycle loop, it is necessary to use twice as many reactants and therefore to produce twice as much waste.

The invention claimed is:

1. A continuous process for decontaminating a radioactive liquid effluent comprising one or more radioactive chemical elements to be removed, the process comprising the following steps:
   bringing said radioactive liquid effluent into contact, in a first reactor, with solid particles capable of capturing and retaining said radioactive chemical element(s) to be removed, to obtain a suspension of solid particles containing said radioactive chemical element(s) to be removed;
   settling said suspension, in a second reactor, to obtain a solid phase that comprises the solid particles containing said radioactive chemical element(s) to be removed and a liquid phase depleted or devoid of said radioactive chemical element(s) to be removed; and
   separating said solid phase and said liquid phase,
   wherein a portion of said solid phase obtained at the end of the settling step is reinjected into the first reactor for performing a contacting step as defined above.

2. The decontamination process according to claim 1, in which the solid particles capable of capturing and retaining said chemical element(s) to be removed in the contacting step comprise:
   a first portion which originates from a continuous flow into the first reactor of unused particles that have not undergone a contacting step with the liquid effluent or of reactants capable of generating, by chemical reaction in said first reactor, said particles; and
   a second portion which results from the reinjection step as defined in claim 1.

3. The decontamination process according to claim 1, in which the radioactive chemical elements are chosen from strontium, ruthenium, caesium, α emitters, such as americium, plutonium and uranium, and mixtures thereof.

4. The decontamination process according to claim 3, in which, when the radioactive chemical element to be removed is strontium, the solid particles are solid particles of barium sulphate, of barium carbonate, of calcium carbonate, of iron hydroxide, of calcium phosphate, of iron phosphate, of manganese dioxide or of titanium dioxide.

5. The decontamination process according to claim 3, in which, when the radioactive chemical element to be removed is ruthenium or an α emitter, the solid particles are solid particles of iron and copper hydroxides.

6. The decontamination process according to claim 3, in which, when the radioactive chemical element to be removed is caesium, the solid particles are solid particles of nickel ferrocyamide and cobalt ferrocyanide, of tetraphenylborate or particles having a zeolite structure.

7. The decontamination process according to claim 5, wherein the α emitter is one of americium, plutonium and uranium.

* * * * *